(12) United States Patent
Bracha et al.

(10) Patent No.: US 7,197,511 B2
(45) Date of Patent: Mar. 27, 2007

(54) METHODS AND APPARATUS FOR TYPE SAFE, LAZY, USER-DEFINED CLASS LOADING

(75) Inventors: Gilad Bracha, Los Altos, CA (US); Sheng Liang, Mountain View, CA (US)

(73) Assignee: Sun Microsystems, Inc., Menlo Park, CA (US)

( * ) Notice: Subject to any disclaimer, the term of this patent is extended or adjusted under 35 U.S.C. 154(b) by 953 days.

(21) Appl. No.: 10/067,349

(22) Filed: Feb. 7, 2002

(65) Prior Publication Data

US 2002/0133643 A1   Sep. 19, 2002

Related U.S. Application Data

(63) Continuation of application No. 09/134,477, filed on Aug. 14, 1998, now Pat. No. 6,430,569.

(51) Int. Cl.
*G06F 17/30* (2006.01)
(52) U.S. Cl. ................ 707/103 R; 707/103 Z
(58) Field of Classification Search ........... 707/1–10, 707/100–104.1, 200–206; 709/223; 717/107, 717/166
See application file for complete search history.

(56) References Cited

U.S. PATENT DOCUMENTS

| | | | |
|---|---|---|---|
| 5,369,766 A | 11/1994 | Nakano et al. | |
| 5,504,568 A | 4/1996 | Saraswat et al. | |
| 5,617,214 A | 4/1997 | Webster et al. | |
| 5,631,740 A | 5/1997 | Webster et al. | |
| 5,634,058 A | 5/1997 | Allen et al. | |
| 5,668,942 A | 9/1997 | Fromherz | |
| 5,694,529 A | 12/1997 | Fromherz | |
| 5,696,893 A | 12/1997 | Fromherz et al. | |
| 5,701,557 A | 12/1997 | Webster et al. | |
| 5,708,811 A | 1/1998 | Arendt et al. | |
| 5,729,790 A | 3/1998 | Conley et al. | |
| 5,740,441 A | 4/1998 | Yellin et al. | |
| 5,771,339 A | 6/1998 | Fromherz | |

(Continued)

FOREIGN PATENT DOCUMENTS

EP    0 778 522 A2    12/1996

(Continued)

OTHER PUBLICATIONS

James Gosling, et al., The Java™ Language Specification (Addison-Wesley, 1996).

(Continued)

*Primary Examiner*—Diane D. Mizrahi
(74) *Attorney, Agent, or Firm*—Finnegan, Henderson, Farabow, Garrett & Dunner LLP (57) ABSTRACT

Type safe linkage is ensured by establishing a constraint if a class references an attribute that is contained in another class. This constraint acts as a "promise" to later ensure type safe linkage. At some point later—such as at the earliest time that the type is loaded by both loaders—the constraint is verified. This may be accomplished by verifying that the type for the attribute is the same regardless of whether it is loaded by a loader that defines the referencing class or a loader that defines the referred class. If the constraint is not met, an error message is provided.

56 Claims, 3 Drawing Sheets

U.S. PATENT DOCUMENTS

| | | | |
|---|---|---|---|
| 5,781,710 | A | 7/1998 | Fromherz et al. |
| 5,812,273 | A | 9/1998 | Conley et al. |
| 5,815,718 | A | 9/1998 | Tock |
| 5,835,688 | A | 11/1998 | Fromherz |
| 5,935,249 | A | 8/1999 | Stern et al. |
| 5,966,702 | A | 10/1999 | Fresko et al. |
| 6,061,721 | A * | 5/2000 | Ismael et al. ............... 709/223 |
| 6,075,940 | A | 6/2000 | Gosling |
| 6,092,147 | A | 7/2000 | Levy et al. |
| 6,092,202 | A | 7/2000 | Veil et al. |
| 6,178,504 | B1 | 1/2001 | Fieres et al. |
| 6,219,787 | B1 | 4/2001 | Brewer |
| 6,223,346 | B1 * | 4/2001 | Tock ......................... 717/166 |
| 6,237,135 | B1 * | 5/2001 | Timbol ....................... 717/107 |
| 6,247,171 | B1 | 6/2001 | Yellin et al. |
| 6,272,641 | B1 | 8/2001 | Ji |
| 6,321,333 | B1 | 11/2001 | Murray |
| 6,430,569 | B1 | 8/2002 | Bracha et al. |
| 6,601,114 | B1 | 7/2003 | Bracha et al. |
| 6,618,769 | B1 | 9/2003 | Bracha et al. |
| 6,618,855 | B1 | 9/2003 | Lindholm et al. |

FOREIGN PATENT DOCUMENTS

| | | | |
|---|---|---|---|
| JP | | 8-022393 | 1/1996 |
| JP | | 9-152961 | 6/1997 |

OTHER PUBLICATIONS

Tim Lindholm and Frank Yellin, The Java™ Virtual Machine Specification (Addison-Wesley) 2nd Ed. 1997-1999).

J. Stanley Warford, *BlackBox: A New Object-Oriented Framework for CS1/CS2*, ACM Press (1998).

"java.lang: Class ClassLoader", visited at http://www.javasoft.com/products/j...ocs/api/java/lang/ClassLoader.html on Oct. 15, 1999, 14 pages.

"Oberon Microsystems: Component Software Resources", visited at http://www.oberon.ch/resources/index.html1#Component Pascal on Oct. 15, 1999, 5 pages.

"Oberon Microsystems: The Evolution of Oberon-2 to Component Pascal", visited at http://www.oberon.ch/resources/component_pascal/evolution.html on Oct. 15, 1999, 12 pages.

"Oberon Microsystems: Component Pascal Language Report", visited at http://www.oberon.ch/resources/component_pascal/language_report.html on Oct. 15, 1999, 29 pages.

"Oberon Microsystems: Brief Comparison of Component Pascal and Java", visited at http://www.oberon.ch/resources/component_pascal/java_component_pascal.html on Oct. 15, 1999, 3 pages.

Cardelli, Luca, "Program Fragments, Linking, And Modularization," Conference Record of POPL: ACM Sigplan-Sigact Symposium on Principles of Programming Language, US, New York, ACE, Conf. 28, Jan. 15, 1997, pp. 266-277, XP000741821.

Dean, Drew, "The Security of Status Typing with Dynamic Linking," Proceedings of the 4th ACM Conference on Computer and Communications Security (CCS '97), Apr. 1997, pp. 18-27, XP002169830.

Fong et al., Phillip W.L., "Proof Linking: An Architecture for Modular Verification of Dynamically-Linked Mobile Code," Software Engineering Notes, US, Association for Computing Machinery, New York, vol. 23, No. 6, Nov. 1998, pp. 220-230, XP000831185.

Liang et al., Sheng, "Dynamic Class Loating in the Java Virtual Machine," ACM Sigplan Notices, US, Association for Computing Machinery, New York, vol. 33, No. 10, Oct. 1998, pp. 36-44, XP000831202.

Litvinov, Vassily, "Constraint-Based Polymorphism in Cecil: Towards a Practical and Static Type System," Department of Computer Science and Engineering, University of Washington, XP-000827881, Oct. 1998, pp. 388-411.

Goldberg, A., "A Specification of Java Loading and Bytecode Verification"; Proceedings of 5th ACM Conference on Computer and Communications Security, San Francisco, CA, Nov. 1998, pp. 49-58.

Jensen, T., et al., "Security and Dynamic Class Loading in Java: A Formalization", Proceedings of the 1998 IEEE Intl. Conference on Computer Languages, Chicago, IL, May 16, 1998, pp. 4-15.

Jensen, T., et al., "Verification of Control Flow Based Security Properties", Proceedings of the 1999 IEEE Symposium on Security and Privacy, May 12, 1999, pp. 89-103.

* cited by examiner

METHODS AND APPARATUS FOR TYPE SAFE, LAZY, USER-DEFINED CLASS LOADING

This is a continuation of application Ser. No. 09/134,477, filed Aug. 14, 1998 now U.S. Pat. No. 6,430,569, which is incorporated herein by reference.

BACKGROUND OF THE INVENTION

A. Field of the Invention

This invention relates generally to class loading, and, more particularly, to methods and apparatus for ensuring type safe linkage of classes in an environment that employs multiple runtime name spaces, user-defined class loaders, and lazy loading of classes.

B. Description of the Related Art

Object-oriented programming techniques have revolutionized the computer industry. For example, such techniques offer new methods for designing and implementing computer programs using an application programming interface (API) with a predefined set of "classes," each of which provides a template for the creation of "objects" sharing certain attributes determined by the class. These attributes typically include a set of data fields and a set of methods for manipulating the object.

The Java™ Development Kit (JDK) from Sun Microsystems, Inc., for example, enables developers to write object-oriented programs using an API with classes defined using the Java™ object-oriented programming language.[1] The Java API consists of a class library having predefined classes. The class library defines a hierarchy of classes with a child class (i.e., subclass) inheriting attributes (i.e., fields and methods) of its parent class. Instead of having to write all aspects of a program from scratch, programmers can simply include selected classes from the API in their programs and extend the functionality offered by such classes as required to suit the particular needs of a program. This effectively reduces the amount of effort generally required for software development.

[1] The Java™ programming language is an object-oriented programming language that is described, for example, in a text entitled "The Java Language Specification" by James Gosling, Bill Joy, and Guy Steele, Addison-Wesley, 1996. Sun, Sun Microsystems, the Sun Logo, Java, and JavaSoft and are trademarks or registered trademarks of Sun Microsystems, Inc. in the United States and other countries.

The JDK also includes a compiler and a runtime system with a virtual machine (VM) for executing programs.[2] In general, software developers write programs in a programming language (in this case the Java programming language) that use classes from the API. Using the compiler, developers compile their programs into files containing "bytecodes." The runtime system integrates the bytecode files with selected classes from the API into an executable application. The Java VM (JVM) then executes the application by converting bytecodes into appropriate instructions executable within a particular operating system/computer hardware. The Java VM thus acts like an abstract computing machine, receiving instructions from programs in the form of bytecodes and interpreting these bytecodes by dynamically converting them into a form for execution, such as object code, and executing them.

[2] Details on the VM for the JDK can be found in a text entitled "The Java Virtual Machine Specification," by Tim Lindholm and Frank Yellin, Addison Wesley, 1996.

The JDK also employs lazy loading, which means that software attributes or classes are only loaded when they are used for the first time, thereby reducing memory usage and improving system response time. During runtime, the JVM invokes one or more class loaders to load any necessary classes. Class loaders are objects that can be defined using the Java™ programming language and represent instances of the class ClassLoader. The ClassLoader.loadClass method accepts a class name as an argument, and returns a Class object that is the runtime representation of a class type. These class loaders may be user-defined; a user may create a class loader to specify, for example, a remote location from which a class is to be loaded or to assign security attributes to a class loaded from a particular source.

At compile time, a class type is typically defined by the name of the class; this is sufficient because the compiler uses a single namespace (i.e., a set of names in which all names are unique). At runtime, however, class loaders may introduce multiple namespaces. As a result, a class type during runtime is defined not by its name alone, but rather by the combination of the class name and its defining class loader.

For example, at compile time, a class named "C" is uniquely identified by its name; and it has a class type represented by C, where C specifies the class name. At runtime, if a class named C is loaded by a class loader L1, L1 is referred to as the defining class loader (or defining loader) for a class named C. Accordingly, at runtime, the type of a class named C is represented by <C, L1>, where C specifies the class name and L1 specifies the class's defining loader. In the same regard, <C, L3> represents a different class type than <C, L1>, even though the two classes share the same name C.

The JVM uses L1, the defining loader for <C, L1> to load not only <C, L1>, but also to load classes that are referenced by <C, L1>. Thus, for example, if <C, L1> references a class named "D," and that class is loaded by L1, then the type of that class is <D, L1>. A class loader may, however, initiate the loading of a class but delegate to another class loader the task of actually loading the class. For example, L1, the defining loader for <C, L1>, may initiate the loading of the class named D, but may delegate the responsibility of actually loading the class named D to another class loader L2. This may be represented by <D, L2>$^{L1}$, where D specifies the class name, L1 specifies the loader that initiated class loading (i.e., the initiating class loader), and L2 specifies D's defining loader. As used herein, notation such as D$^{L1}$ refers to a class named D having an initiating loader L1. Thus, based on whether loader L1 itself loads the class named D or delegates that responsibility to L2, the class type may be either <D, L1> or <D, L2>; in fact, <D, L1> and <D, L2>completely different and unrelated classes having different methods or fields.

This situation may lead to a lack of type safe linkage. A program is type safe if it only operates on data using operations that are defined for the type of that data. The type safe linkage problem may be demonstrated via a simple example, using the sample software code presented below. For the sake of clarity, the class type notation described above is used where class names would normally appear.

```
class <C, L1> {
    void f( ) {
        <E, L1>$^{L1}$ x = <D, L2>$^{L1}$.g
    }
}
class <D, L2> {
    <E, L2>$^{L2}$ g( ) {...}
}
class <E, L2> {
    private int secret_value;
}
```

-continued

```
class <E, L1> {
        public int secret_value;
}
```

Because <C, L1> is defined by L1, L1 is used to initiate the loading of classes named E and D referenced within <C, L1>. Although L1 is the defining loader for the class named E, L1 delegates to L2 the task of loading the class named D. As a result, L2 is the defining loader for the class named D, and is used by D.g to load the class named E. As it happens, the class named E loaded by L2 is different from the class named E loaded by L1. <C, L1> expects an instance of <E, L1> to be returned by D.g, but actually receives an instance of <E, L2>, which is a completely different class. Because of this difference, class <C, L1> is able to print the private field secret_value from an instance of <E, L2>, thereby compromising security. There exists, therefore, a need for a system that ensures type safe linkage in an environment that employs multiple runtime name spaces, user-defined class loaders, and lazy loading of classes.

SUMMARY OF THE INVENTION

Methods and apparatus consistent with the present invention, as embodied and broadly described herein, ensure type safe linkage of classes in an environment that employs multiple runtime name spaces, user-defined class loaders, and lazy loading of classes.

Consistent with the invention, a method for [to be completed using claim language].

Consistent with the invention, a method is provided for determining a constraint used for ensuring type safe linkage. The method includes creating an entry in a constraint table for a class name, creating a first entry in a loaded class cache (LCC) for the class name and a first loading object, creating a second entry in the LCC for the class name and a second loading object, and defining the constraint table entry based on the first and second entries in the LCC to ensure type safe linkage.

Further consistent with the invention, a system is provided for ensuring type safe linkage during execution of a program. The system includes a memory including instructions for performing a process for identifying a first class that makes a symbolic reference to an attribute contained in a second class, instructions for performing a process for imposing a constraint associated with the referenced attribute, and instructions for performing a process for verifying when the program is executed that the symbolic reference complies with the constraint. The system also includes a processor for executing instructions included in the memory to ensure type safe linkage during execution of the program.

Further consistent with the invention, a computer-readable storage medium is provided including instructions for performing a method, when executed by a processor, for determining a constraint used for ensuring type safe linkage. The method includes creating an entry in a constraint table for a class name, creating a first entry in a loaded class cache (LCC) for the class name and a first loading object, creating a second entry in the LCC for the class name and a second loading object, and defining the constraint table entry based on the first and second entries in the LCC to ensure type safe linkage.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. The same reference numbers may be used throughout the drawings and the following description to refer to the same or like parts.

A. Overview

Methods and apparatus consistent with the invention ensure type safe linkage of classes in an environment that employs multiple runtime name spaces, user-defined class loaders, and lazy loading of classes. This is accomplished by creating and maintaining a set of loader constraints that are dynamically updated as class loading takes place.

More specifically, methods and apparatus consistent with the invention identify whether a class references an attribute that is contained in another class. The attribute may be, for example, a field, a method, or a method that is overridden by another method. If a class references an attribute that is contained in another class, a constraint is established. This constraint acts as a "promise" to later ensure type safe linkage. At some point later—for example, at the earliest time that the type is loaded by both loaders—methods and apparatus verify that the constraint has been met. This may be accomplished by verifying that the type for the attribute is the same regardless of whether it is loaded by a loader that defines the referencing class or a loader that defines the referred class. If the constraint is not met, an error message is provided.

B. Architecture

Figure 1:
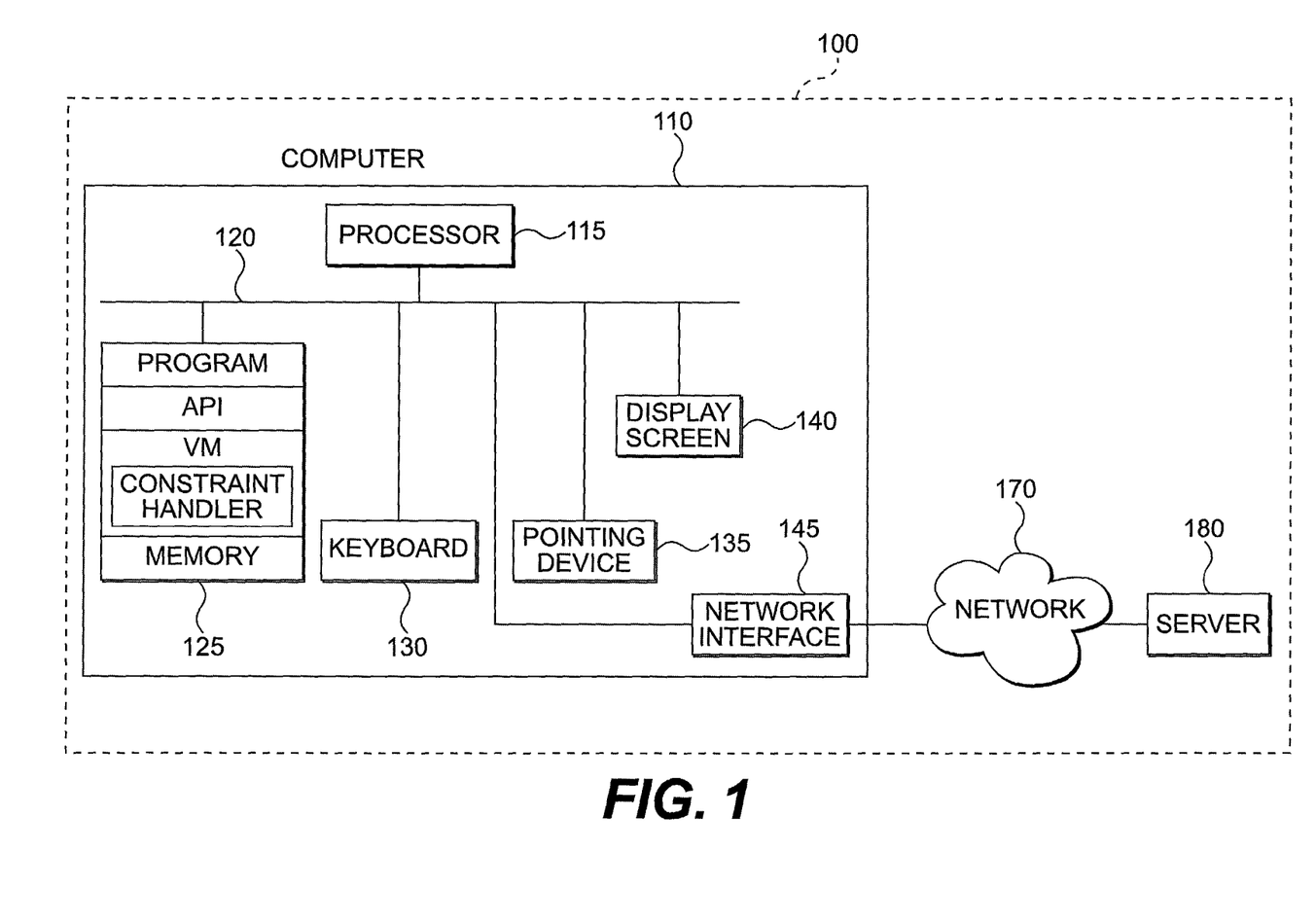
FIG. 1 is a block diagram of a computer system in which methods and apparatus consistent with the invention may be implemented.

FIG. 1 is a block diagram of a computer system 100 in which methods and apparatus consistent with the invention may be implemented. System 100 comprises a computer 110 connected to a server 180 via a network 170. Network 170 may be a local area network (LAN), a wide area network (WAN), or the Internet. System 100 is suitable for use with the Java™ programming language, although one skilled in the art will recognize that methods and apparatus consistent with the invention may be applied to other suitable user environments.

Computer 110 comprises several components that are all interconnected via a system bus 120. Bus 120 may be, for example, a bi-directional system bus that connects the components of computer 110, and contains thirty-two address lines for addressing a memory 125 and a thirty-two bit data bus for transferring data among the components. Alternatively, multiplex data/address lines may be used instead of separate data and address lines. Computer 110 communicates with other computers on network 170 via a network interface 145, examples of which include Ethernet or dial-up telephone connections.

Computer 110 contains a processor 115 connected to a memory 125. Processor 115 may be microprocessor manufactured by Motorola, such as the 680X0 processor or a processor manufactured by Intel, such as the 80X86 or Pentium processors, or a SPARC™ microprocessor from Sun Microsystems, Inc. However, any other suitable microprocessor or micro-, mini-, or mainframe computer, may be used. Memory 125 may comprise a RAM, a ROM, a video memory, or mass storage. The mass storage may include both fixed and removable media (e.g., magnetic, optical, or magnetic optical storage systems or other available mass storage technology). Memory 125 may contain a program, an application programming interface (API), and a virtual machine (VM) that contains instructions for handling constraints, consistent with the invention.

A user typically provides information to computer 110 via a keyboard 130 and a pointing device 135, although other input devices may be used. In return, information is conveyed to the user via display screen 140.

C. Architectural Operation

As used hereinafter, the term "attribute" refers to a method, a field, or both. Each attribute is associated with a "type," which may be a primitive type, such as int, or a reference type, such as a class or interface. As used hereinafter, the terms "type," "reference type," and "class type" may be used as shorthand for "class type."

Figure 2:
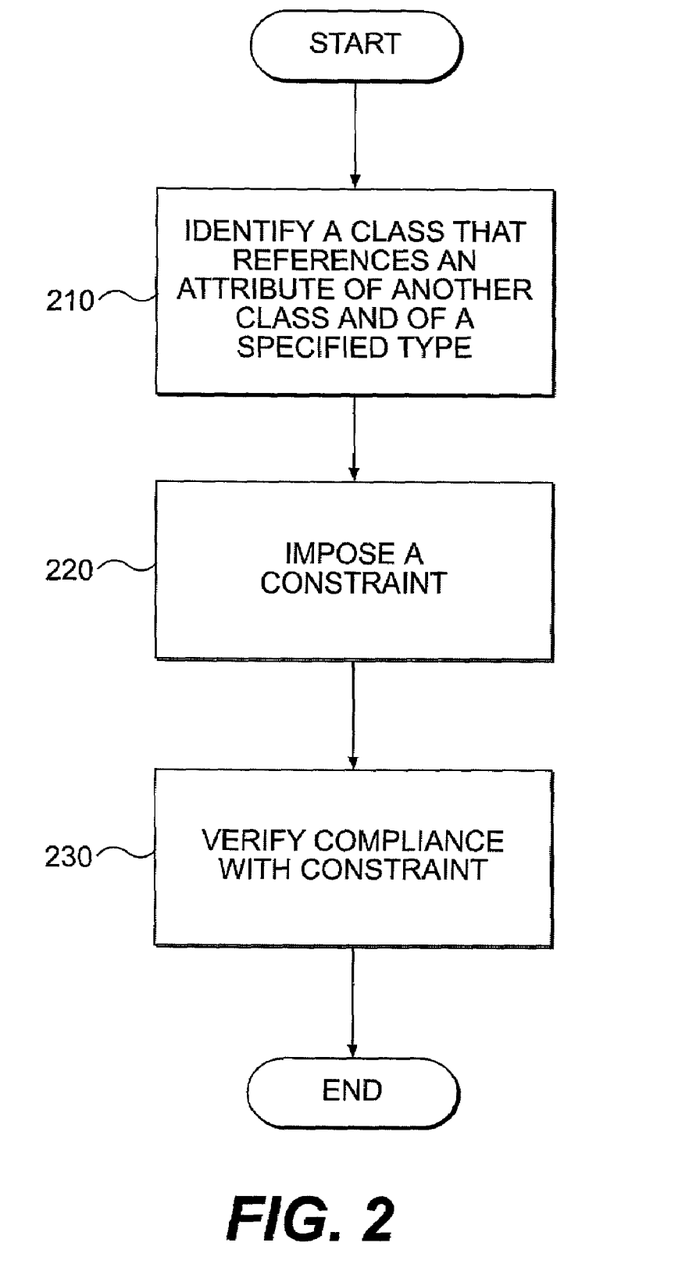
FIG. 2 is a flow diagram of a method for ensuring class type safe linkage consistent with the invention.

FIG. 2 is a flow diagram of a method for ensuring class type safe linkage consistent with the invention. After program execution begins, system 100 identifies a class that makes a symbolic reference to a class or attribute that is contained in another class (step 210). While resolving the symbolic reference, system 100 imposes a constraint that may later be used to ensure type safe linkage for the referenced attribute (step 220). In general, this constraint requires that the type of the referenced attribute when loaded by a loader that defines the referencing class be the same as the type for the referenced attribute when loaded by a loader that defines the referenced class. At some point later during execution, system 100 verifies compliance with the constraint (step 230).

Figure 3:
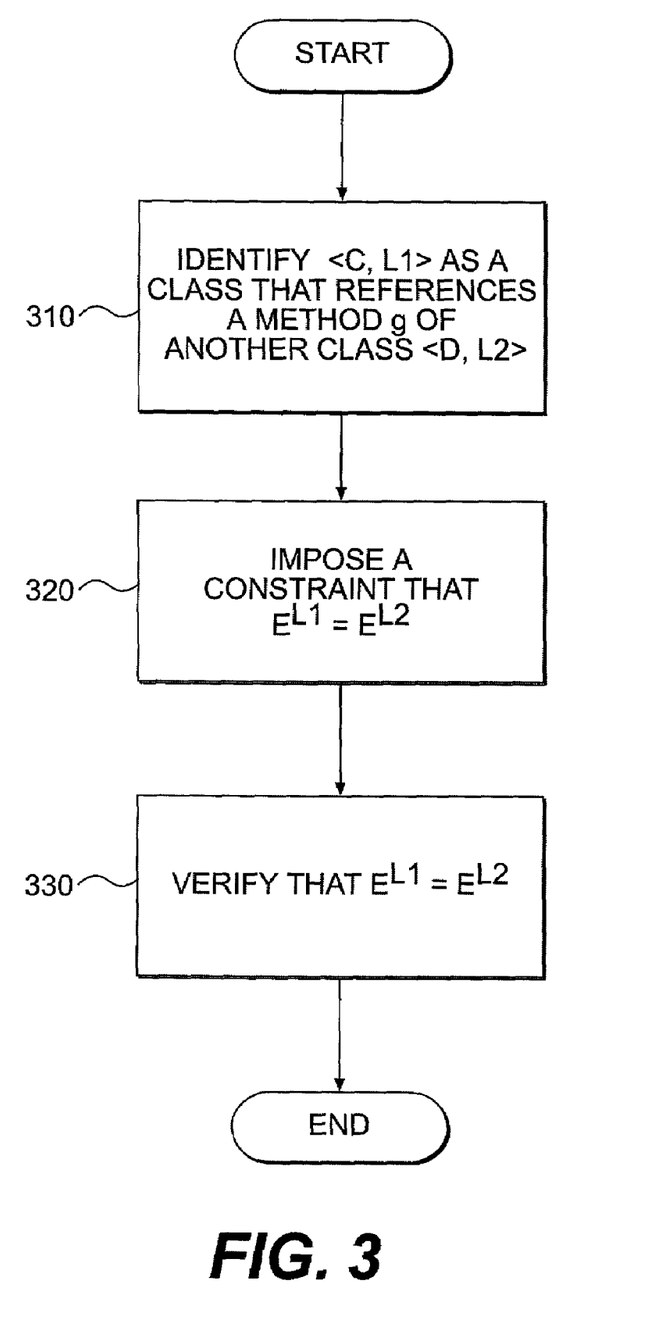
FIG. 3 is a flow diagram of an exemplary method for ensuring class type safe linkage consistent with the invention.

FIG. 3 is a flow diagram of an exemplary method for ensuring class type safe linkage consistent with the invention. For the sake of explanation, FIG. 3 is described in reference to the sample software code set forth in the Description of the Related Art.

In the example shown, system 100 identifies a class that makes a symbolic reference to a class or attribute that is contained in another class when system 100 executes an instruction contained in a class <C, L1> that references a method g( ) in a class <D, L2> (step 310). Resolving such a symbolic reference involves a loaded class cache (LCC) and a constraint table (CT).

A loaded class cache (LCC) maps a class name (e.g., E) and an initiating class loader (e.g., L1) to the runtime representation of a class type (e.g., $C_{L1}$). The combination of the class name and the initiating class loader constitute a "key" that yields a "return" class type. This may be represented as $LCC(E,L1)=C_{L1}$. When E is referenced, the JVM checks the LCC to determine whether E has previously been loaded by L1 (which is the defining loader of the referencing class). If so, the reference is resolved to the class type stored at the LCC entry for (E,L1). If not, the JVM loads the referenced class by using the initiating loader and enters the class into the LCC.

The CT maps a class name to a set of pairs. Each pair consists of a class type and a set of initiating class loaders. Given a class name, one can extract from the CT all constraints placed on the class. More specifically, for a given class named E, $CT(E)=\{P_1 \ldots P_k\}$, where each pair $P_i=(S_i, T_i)$, for i=1 ... k, where $T_i$ represents a class type and where $S_i=\{Li1 \ldots Lin\}$, where each Li represents an initiating loader.

To create an entry $LCC(E,L1)=T_{L1}$, the JVM creates an LCC entry indexed by the key (E,L1) with a null class type. If no entry CT(E) exists, the JVM creates a CT entry indexed by E, and initializes it to an empty set. The JVM also checks each pair $P_i$ from CT(E) to see if L1 is in $S_i$. If there does not exist such a pair $P_i$ (i.e., there exists no constraint on $E^{L1}$), the JVM sets $LCC(E,L1)=T_{L1}$. If there exists such a pair $P_i$ (i.e., there exists a constraint on $E^{L1}$), the JVM checks to see if the two class types, $T_{L1}$ and $T_i$, are compatible. Two class types are compatible if they are the same or if one is a null type. In other words, compatible$(T_{L1},T_i)=(T_{L1}=T_i)$ or $(T_{L1}=null)$ or $(T_i=null)$. If the two class types $T_{L1}$ and $T_i$ are not compatible, an error is indicated. If the two types are compatible, the pair $P_i$ is set to $(S_i, join(T_i, T_{L1}))$ and $LCC(E, L1)=T_{L1}$. Join $(T_i, T_{L1})=T_{L1}$ if $T_i$ is null, otherwise the result is $T_i$ (assuming $T_i$ and $T_{L1}$ are co mpatible as defined above). The JVM also checks to ensure that the class type actually loaded has the same name as the referenced class. If it does not, an error is indicated.

While resolving the symbolic reference, system 100 imposes a constraint that requires that the type of the referenced attribute (e.g., the class named $E^{L1}$) when loaded by a loader that defines the referencing class (e.g., L1 for <C, L1>) be the same as the type for the referenced attribute (e.g., the class named $E^{L2}$) when loaded by a loader that defines the referenced class (e.g., L2 for <D, L2>). In the example shown, system 100 imposes the constraint that $E^{L1}=E^{L2}$ (step 320). In one embodiment, both the identifying step and the step of imposing the constraint are performed when the method call to D.g is resolved.

The specific constraint imposed may vary depending on the programming language or the nature of the reference, but some examples for the Java™ programming language include the following:

- If<C, L1> references a field
    E fieldname;
declared in class <D, L2>, then the following constraint may be generated: $E^{L1} = E^{L2}$.
- If<C, L1> contains an invocation of a method
    E0 methodname (E1, E2, ..., En);
declared in class <D, L2>, then the following constraints may be generated: $E0^{L1} = E0^{L2}$, $E1^{L1} = E1^{L2}$, ..., $En^{L1} = En^{L2}$.
- If <C, L1> declares a method
    E0 methodname (E1, E2, ..., En);
inherited from a declaration in a class <D, L2>, then the following constraint is generated: $E0^{L1} = E0^{L2}$, $E1^{L1} = E1^{L2}$, ..., $En^{L1} = En^{L2}$.

At some point later during execution, the constraint is verified to ensure type safe linkage. For example, this may occur at the earliest time that the type for the referenced attribute (e.g., the class named E) is loaded by both the loaders that define the referencing class (L1) and the referenced class (L2) (step 330). In some cases, the constraint may be verified when the type for the referenced attribute (e.g., the class named E) is loaded by only one of the loaders that define the referencing class (L1) and the referenced class (L2). During the process of loading the class named E using both L1 and L2, system 100 receives identification of the loader that defines the class named E in each case. System 100 may compare this information to ensure that the same defining loader is used to load the class named E regardless of whether the loading of the class named E is initiated by L1 or L2. If the verification fails, an error message may be generated.

A constraint such as $E^{L1}=E^{L2}$ is imposed or generated as follows. If there exists no entry CT(E), then one is created by creating an entry in the CT that is indexed by E and is initialized to an empty set. If there exists no entry LCC(E, L1), then one is created as described above. If there exists no entry LCC(E,L2), then one is created as described above. This results in one of four possible combinations for CT(E)= $\{P_1 \ldots P_k\}$.

The first possibility is that there exist no constraints on either $E^{L1}$ or $E^{L2}$. in other words, no set $S_i$ contains either L1 or L2. If $E^{L1}$ and $E^{L2}$ are not compatible (as defined above), an error is indicated. Otherwise, the JVM sets P=({L1,L2}, join($E^{L1}$, $E^{L2}$)) and adds P to CT(E).

The second possibility is that $E^{L1}$ is constrained but $E^{L2}$ is not yet constrained. In other words, a set $S_{L1}$ contains L1, but no set $S_i$ contains L2. In this case, the JVM checks to ensure that $T_{L1}$ (the class type corresponding to $E^{L1}$) and $E^{L2}$ are compatible (as defined above). If not, an error is indicated. If they are compatible, L2 is added to $S_{L1}$ and $P_{L1}$ is set to ($S_{L1}$, join($T_{L1}$, $E^{L2}$)).

The third possibility is that $E^{L2}$ is constrained but $E^{L1}$ is not yet constrained. In other words, a set $S_{L2}$ contains L2, but no set $S_i$ contains L1. In this case, the JVM checks to ensure that $T_{L2}$ (the class type corresponding to $E^{L2}$) and $E^{L1}$ are compatible (as defined above). If not, an error is indicated. If they are compatible, L1 is added to $S_{L2}$ and $P_{L2}$ is set to ($S_{L2}$, join ($T_{L2}$, $E^{L1}$)).

The fourth possibility is that both $E^{L1}$ and $E^{L2}$ are constrained. In other words, a set $S_{L1}$ contains L1, and a set $S_{L2}$ contains L2. If $S_{L1}=S_{L2}$, the constraint already exists and no action is necessary. Otherwise, the JVM checks to ensure that $T_{L1}$ (the class type corresponding to $E^{L1}$) and $T_{L2}$ (the class type corresponding to $E^{L2}$) are compatible (as defined above). If not, an error is indicated. If they are compatible, $S_{L1}$ and $S_{L2}$ are merged into a new set S, and P is set to (S, join($T_{L1}$, $T_{L2}$)). P is added to CT(E) and $P_{L1}$ and $P_{L2}$ are removed from CT(E).

D. Conclusion

As described in detail above, methods and apparatus consistent with the invention ensure type safe linkage of classes in an environment that employs multiple runtime name spaces, user-defined class loaders, and lazy loading of classes. The foregoing description of an implementation of the invention has been presented for purposes of illustration and description. Modifications and variations are possible in light of the above teachings or may be acquired from practicing the invention.

For example, although the example used in the description indicates that the result of the method call to D.g is placed into a variable x that is of type $<E, L1>^{L1}$, methods and apparatus consistent with the invention do not require that the referencing class (e.g., <C, L1>) actually contain a variable or attribute that is of the same type as the referenced attribute. Furthermore, the description above indicates that the imposition and verification of the constraints are performed at certain times during execution, but those skilled in the art will recognize that those steps may be performed at other times during execution. Moreover, the description above is based on reference types based on one or more classes, but those skilled in the art will recognize that the invention is consistent with other types.

In addition, the foregoing description is based on the Java™ programming environment, but those skilled in the art will recognize that another programming environment may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for determining a constraint used for ensuring type safe linkage, comprising:
    creating an entry in a constraint table for a class name;
    creating a first entry in a loaded class cache (LCC) for the class name and a first loading object;
    creating a second entry in the LCC for the class name and a second loading object; and
    defining the constraint table entry based on the first and second entries in the LCC to ensure type safe linkage.

2. The method of claim 1, wherein defining the constraint table entry comprises: indicating an error based on a determination that a class type associated with the first entry is not compatible with a class type associated with the second entry.

3. The method of claim 1, wherein defining the constraint table entry comprises:
    defining a pair of objects for the constraint table entry that includes a set comprising the first and second loading objects and an indication reflecting either a class type associated with the first entry or a class type associated with the second entry.

4. The method of claim 3, wherein the pair of objects is defined based on a determination that the first and second loading objects are not associated with a set of loading objects corresponding to the constraint table entry.

5. The method of claim 1, wherein defining the constraint table entry comprises:
    determining that a first set corresponding to the constraint table entry includes the first loading object and not the second loading object.

6. The method of claim 5, further comprising:
    adding the second loading object to the first set; and
    defining a pair of objects corresponding to the constraint table entry that includes the first set and either a class type associated with the first entry or a class type associated with the second entry.

7. The method of claim 1, wherein defining the constraint table entry comprises:
    determining that a first set corresponding to the constraint table entry includes the second loading object and not the first loading object.

8. The method of claim 7, further comprising:
    adding the first loading object to the first set; and
    defining a pair of objects corresponding to the constraint table entry that includes the first set and either a class type associated with the first entry or a class type associated with the second entry.

9. The method of claim 1, wherein defining the constraint table entry comprises:
   determining that a first set corresponding to the constraint table entry includes the first loading object and a second set corresponding to the constraint table entry includes the second loading object.

10. The method of claim 9, further comprising:
   merging the first set and the second set into a new set; and
   defining a pair of objects corresponding to the constraint table entry that includes the new set and either a class type associated with the first entry or a class type associated with the second entry.

11. A method for providing type safe linkage, comprising:
   providing a cache that maps a class name and loader object to a class type;
   providing a constraint table that maps the class name to one or more pairs of a class type and a set of loader objects; and
   providing type safe linkage during execution of a process based on the cache and constraint table.

12. The method of claim 11, wherein providing a cache comprises:
   creating an entry in the cache that returns a class type equal to the class type included in the one or more pairs based on the class name and loader object.

13. The method of claim 12, wherein creating an entry in the cache comprises:
   creating an entry in the constraint table that is indexed by the class name; and
   setting the class type equal to the class type included in the one or more pairs based on a determination that the loader object is not included in the set of loader objects.

14. The method of claim 13, wherein creating an entry in the constraint table that is indexed by the class name is based on a determination that there is no entry in the constraint table for the class name.

15. The method of claim 12, wherein creating an entry in the cache comprises:
   determining that the loader object is included in the set of loader objects; and
   setting the class type equal to the class type included in the one or more pairs based on a determination whether the class type and the class type included in the one or more pairs are compatible.

16. The method of claim 15, wherein the class types are compatible when they are the same type or either class type is a null type.

17. The method of claim 11, wherein providing type safe linkage during execution of a process comprises:
   determining that the class name is referenced;
   determining, in response to the reference, whether the class was previously loaded by the loader object based on the cache; and
   loading the referenced class name using the loader object and placing an entry for the loaded class name into the cache.

18. A system for ensuring type safe linkage during execution of a program, comprising:
   a memory including instructions for performing a process for identifying a first class that makes a symbolic reference to an attribute contained in a second class, instructions for performing a process for imposing a constraint associated with the referenced attribute, and instructions for performing a process for verifying when the program is executed that the symbolic reference complies with the constraint; and
   a processor for executing the instructions included in the memory to ensure type safe linkage during execution of the program.

19. The system of claim 18, wherein the constraint requires that a type of the attribute, when loaded by a loader that defines the first class, is the same as the type when loaded by a loader that defines the second class.

20. The system of claim 18, wherein the attribute is a field that is contained in the second class.

21. The system of claim 18, wherein the attribute is a method that is contained in the second class.

22. The system of claim 18, wherein the instructions reflecting a process for verifying is executed by the processor when the attribute is loaded by a loader that defines at least one of the first and second classes.

23. A system for determining a constraint used for ensuring type safe linkage, comprising:
   means for creating an entry in a constraint table for a class name;
   means for creating a first entry in a loaded class cache (LCC) for the class name and a first loading object;
   means for creating a second entry in the LCC for the class name and a second loading object; and
   means for defining the constraint table entry based on the first and second entries in the LCC to ensure type safe linkage.

24. The system of claim 23, wherein the means for defining the constraint table entry comprises:
   means for indicating an error based on a determination that a class type associated with the first entry is not compatible with a class type associated with the second entry.

25. The system of claim 23, wherein the means for defining the constraint table entry comprises:
   means for defining a pair of objects for the constraint table entry that includes a set comprising the first and second loading objects and an indication reflecting either a class type associated with the first entry or a class type associated with the second entry.

26. The system of claim 25, wherein the pair of objects is defined based on a determination that the first and second loading objects are not associated with a set of loading objects corresponding to the constraint table entry.

27. The system of claim 23, wherein the means for defining the constraint table entry comprises:
   means for determining that a first set corresponding to the constraint table entry includes the first loading object and not the second loading object.

28. The system of claim 27, further comprising:
   means for adding the second loading object to the first set; and
   means for defining a pair of objects corresponding to the constraint table entry that includes the first set and either a class type associated with the first entry or a class type associated with the second entry.

29. The system of claim 23, wherein the means for defining the constraint table entry comprises:
   means for determining that a first set corresponding to the constraint table entry includes the second loading object and not the first loading object.

30. The system of claim 29, further comprising:
   means for adding the first loading object to the first set; and
   means for defining a pair of objects corresponding to the constraint table entry that includes the first set and either a class type associated with the first entry or a class type associated with the second entry.

31. The system of claim 23, wherein the means for defining the constraint table entry comprises:
   means for determining that a first set corresponding to the constraint table entry includes the first loading object and a second set corresponding to the constraint table entry includes the second loading object.

32. The system of claim 31, further comprising:
   means for merging the first set and the second set into a new set; and
   means for defining a pair of objects corresponding to the constraint table entry that includes the new set and either a class type associated with the first entry or a class type associated with the second entry.

33. A system for providing type safe linkage, comprising:
   means for providing a cache that maps a class name and loader object to a class type;
   means for providing a constraint table that maps the class name to one or more pairs of a class type and a set of loader objects; and
   means for providing type safe linkage during execution of a process based on the cache and constraint table.

34. The system of claim 33, wherein the means for providing a cache comprises:
   means for creating an entry in the cache that returns a class type equal to the class type included in the one or more pairs based on the class name and loader object.

35. The system of claim 34, wherein the means for creating an entry in the cache comprises:
   means for creating an entry in the constraint table that is indexed by the class name; and
   means for setting the class type equal to the class type included in the one or more pairs based on a determination that the loader object is not included in the set of loader objects.

36. The system of claim 35, wherein the means creating an entry in the constraint table that is indexed by the class name includes means for determining whether there is an entry in the constraint table for the class name.

37. The system of claim 34, wherein the means for creating an entry in the cache comprises:
   means for determining that the loader object is included in the set of loader objects; and
   means for setting the class type equal to the class type included in the one or more pairs based on a determination whether the class type and the class type included in the one or more pairs are compatible.

38. The system of claim 37, wherein the class types are compatible when they are the same type or either class type is a null type.

39. The system of claim 33, wherein the means for providing type safe linkage during execution of a process comprises:
   means for determining that the class name is referenced;
   means for determining, in response to the reference, whether the class was previously loaded by the loader object based on the cache; and
   means for loading the referenced class name using the loader object and placing an entry for the loaded class name into the cache.

40. A computer-readable storage medium including instructions for performing a method, when executed by a processor, for determining a constraint used for ensuring type safe linkage, the method comprising:
   creating an entry in a constraint table for a class name;
   creating a first entry in a loaded class cache (LCC) for the class name and a first loading object;
   creating a second entry in the LCC for the class name and a second loading object; and
   defining the constraint table entry based on the first and second entries in the LCC to ensure type safe linkage.

41. The computer-readable storage medium of claim 40, wherein defining the constraint table entry comprises:
   indicating an error based on a determination that a class type associated with the first entry is not compatible with a class type associated with the second entry.

42. The computer-readable storage medium of claim 40, wherein defining the constraint table entry comprises:
   defining a pair of objects for the constraint table entry that includes a set comprising the first and second loading objects and an indication reflecting either a class type associated with the first entry or a class type associated with the second entry.

43. The computer-readable storage medium of claim 42, wherein the pair of objects is defined based on a determination that the first and second loading objects are not associated with a set of loading objects corresponding to the constraint table entry.

44. The computer-readable storage medium of claim 40, wherein defining the constraint table entry comprises:
   determining that a first set corresponding to the constraint table entry includes the first loading object and not the second loading object.

45. The computer-readable storage medium of claim 44, further comprising:
   adding the second loading object to the first set; and
   defining a pair of objects corresponding to the constraint table entry that includes the first set and either a class type associated with the first entry or a class type associated with the second entry.

46. The computer-readable storage medium of claim 40, wherein defining the constraint table entry comprises:
   determining that a first set corresponding to the constraint table entry includes the second loading object and not the first loading object.

47. The computer-readable storage medium of claim 46, further comprising:
   adding the first loading object to the first set; and
   defining a pair of objects corresponding to the constraint table entry that includes the first set and either a class type associated with the first entry or a class type associated with the second entry.

48. The computer-readable storage medium of claim 40, wherein defining the constraint table entry comprises:
   determining that a first set corresponding to the constraint table entry includes the first loading object and a second set corresponding to the constraint table entry includes the second loading object.

49. The computer-readable storage medium of claim 48, further comprising:
   merging the first set and the second set into a new set; and
   defining a pair of objects corresponding to the constraint table entry that includes the new set and either a class type associated with the first entry or a class type associated with the second entry.

50. A computer-readable storage medium including instructions for performing a method, when executed by a processor, for providing type safe linkage, the method comprising:
   providing a cache that maps a class name and loader object to a class type;

providing a constraint table that maps the class name to one or more pairs of a class type and a set of loader objects; and providing type safe linkage during execution of a process based on the cache and constraint table.

51. The computer-readable storage medium of claim 50, wherein providing a cache comprises:

creating an entry in the cache that returns a class type equal to the class type included in the one or more pairs based on the class name and loader object.

52. The computer-readable storage medium of claim 51, wherein creating an entry in the cache comprises:

creating an entry in the constraint table that is indexed by the class name; and setting the class type equal to the class type included in the one or more pairs based on a determination that the loader object is not included in the set of loader objects.

53. The computer-readable storage medium of claim 52, wherein creating an entry in the constraint table that is indexed by the class name is based on a determination that there is no entry in the constraint table for the class name.

54. The computer-readable storage medium of claim 51, wherein creating an entry in the cache comprises:

determining that the loader object is included in the set of loader objects; and setting the class type equal to the class type included in the one or more pairs based on a determination whether the class type and the class type included in the one or more pairs are compatible.

55. The computer-readable storage medium of claim 54, wherein the class types are compatible when they are the same type or either class type is a null type.

56. The computer-readable storage medium of claim 50, wherein providing type safe linkage during execution of a process comprises:

determining that the class name is referenced;

determining, in response to the reference, whether the class was previously loaded by the loader object based on the cache; and loading the referenced class name using the loader object and placing an entry for the loaded class name into the cache.

* * * * *